United States Patent
Ozaki et al.

(10) Patent No.: US 6,207,291 B1
(45) Date of Patent: Mar. 27, 2001

(54) HIGH-TEMPERATURE SLIDING ALLOY AND SLIDING CONTACT STRUCTURE USING SAME

(75) Inventors: Kouki Ozaki; Hideyumi Matsumura; Takayuki Shibayama, all of Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/186,376

(22) Filed: Nov. 5, 1998

(30) Foreign Application Priority Data

Dec. 4, 1997 (JP) .................................................. 9-352275

(51) Int. Cl.$^7$ ................................ B22F 3/00; C22C 29/00
(52) U.S. Cl. .......................... 428/546; 428/469; 428/701; 428/702; 75/243; 75/246; 384/912; 420/454
(58) Field of Search ..................................... 428/546, 469, 428/701, 702; 75/228, 246, 234, 243; 148/317; 420/454; 384/625, 912, 913, 910; 123/188.3

(56) References Cited

U.S. PATENT DOCUMENTS 4,005,915 * 2/1977 Canfield .
5,289,067 * 2/1994 Tanaka et al. .
5,499,936 * 3/1996 McElroy et al. .
5,895,516 * 4/1999 Tanaka et al. .

FOREIGN PATENT DOCUMENTS 5-017839  1/1993  (JP) .
7-292430  11/1995  (JP) .

* cited by examiner

*Primary Examiner*—Deborah Jones
*Assistant Examiner*—Jennifer McNeil
(74) *Attorney, Agent, or Firm*—Browdy and Neimark

(57) ABSTRACT

There is disclosed a high temperature sliding alloy consisting of, by weight, 2 to 8% Cr, 2 to 10% Fe, 0.1 to 1.5% Si, 2 to 22% Co, 1.4 to 11% Mo, and the balance Ni, wherein 1 to 35% by weight of Co—Mo—Cr—Si base hard particles are dispersed in a matrix of the sliding alloy, and each of the hard particles has an oxide phase formed on a surface thereof. With this construction, the sliding alloy exhibits excellent sliding properties and particularly a low friction coefficient and excellent wear resistance in the temperature range of from a room temperature to 900° C.

3 Claims, 2 Drawing Sheets

HIGH-TEMPERATURE SLIDING ALLOY AND SLIDING CONTACT STRUCTURE USING SAME

BACKGROUND OF THE INVENTION

This invention relates to a high-temperature sliding alloy used in an oxidizing atmosphere under a high temperature condition ranging from a room temperature to a high temperature, and also relates to a sliding contact structure comprising a sliding member, made of this sliding alloy, and a mating member disposed in sliding contact with the sliding member.

Conventional high-temperature sliding alloys are disclosed, for example, JP-A-5-17839 and JP-A-7-292430 filed by the Applicant of the present application. These sliding alloys have a structure in which Co—Mo—Cr—Si base hard particles are dispersed in the matrix of Ni base alloy.

The sliding alloy, disclosed in JP-A-5-17839, consists of, by weight, 9 to 30% Cr, 5 to 19% Fe, 0.1 to 1.5% Si, 2 to 22% Co, 1.4 to 11% Mo, and the balance Ni and unavoidable impurities, and has the structure in which 5 to 35% by volume of Co—Mo—Cr—Si base hard particles are dispersed in the matrix. This sliding alloy is suitably used particularly when a mating member is made of a hard material, such as a precipitation hardening-type Ni base heat-resistant alloy, having a hardness of Hv300 to 500, and for example, this sliding alloy is suitably adapted to an exhaust gas control valve of a petrol (gasoline) or a diesel engine, and a variable valve in a gas turbine.

The sliding alloy, disclosed in JP-A-7-292430, consists of, by weight, 2 to 8% Cr, 2 to 10% Fe, 0.1 to 1.5% Si, 2 to 22% Co, 1.4 to 11% Mo, and the balance Ni and unavoidable impurities, and has the structure which comprises 5 to 35% by weight of Co—Mo—Cr—Si base hard particles dispersed in the matrix. Even when a mating member is made of a soft material such as austenitic stainless steel, this sliding alloy alleviates wear of the mating material, and therefore there can be achieved a sliding contact structure, comprising a sliding member (made of this sliding alloy) and the mating member disposed in sliding contact therewith, which sliding contact structure is excellent in durability.

A bearing for use in a carriage for charging a product to be heat treated into a heat treatment furnace, is required to possess excellent bearing properties (such as wear resistance) not only under a high temperature condition in the furnace but also under a room temperature condition.

However, the above conventional sliding members exhibit excellent sliding properties at a high temperature, but the sliding properties and particularly the friction coefficient have been found not entirely satisfactory at a room temperature.

SUMMARY OF THE INVENTION

It is therefore an object of this invention to provide a sliding alloy which exhibits excellent sliding properties and particularly a low friction coefficient and excellent wear resistance at temperatures ranging from room temperature to 900° C.

According to the feature of the present invention, there is provided a high temperature sliding alloy consisting of, by weight, 2 to 8% Cr, 2 to 10% Fe, 0.1 to 1.5% Si, 2 to 22% Co, 1.4 to 11% Mo, and the balance Ni, which comprises 1 to 35% by weight of Co—Mo—Cr—Si base hard particles dispersed in a matrix of the sliding alloy, and each of the hard particles has an oxide phase formed on a surface thereof.

The reason why the Cr content should be 2 to 8 wt. % is that if this content is less than 2 wt. %, the matrix fails to have a sufficient oxidation resistance, and if this content is more than 8 wt. %, the rate of compacting of powder can not be increased, so that a sintered product of a high density can not be obtained. Therefore, the Cr content should be 2 to 8 wt. %, and the content of 5 to 7 wt. % is particularly preferred from the viewpoints of the formability and oxidation resistance.

The reason why the Fe content should be 2 to 10 wt. % is that if this content is less than 2 wt. %, the high temperature strength is inferior, and if this content is more than 10 wt. %, the powder, used to form a compact, becomes hard, and therefore the rate of compacting of the powder can not be increased, so that the sintered product of a high density can not be obtained. Therefore, the Fe content should be 2 to 10 wt. %. The content of 4 to 6 wt. % is particularly preferred since the high temperature strength becomes more excellent, and better oxidation resistance is obtained.

The reason why the content of the Co—Mo—Cr—Si base hard particles should be 1 to 35 wt. % is that if this content is less than 1 wt. %, the effect of enhancing the sliding properties at high temperatures is not satisfactory, and if this content is more than 35 wt. %, the formability of the powder becomes poor, and the alloy becomes hard, so that the amount of wear of the mating member increases when the sliding member and the mating member slide relative to each other. It is particularly preferred that the Co—Mo—Cr—Si base hard particles having a particle size of 100 to 200 μm, are uniformly dispersed in the matrix.

The Co—Mo—Cr—Si base hard particles have a close-packed hexagonal crystal structure consisting of, by weight, 26 to 30% Mo, 7.5 to 9.5% Cr, 2.4 to 2.6% Si, and the balance Co.

In order to form the Co—Mo—Cr—Si base hard particles having the close-packed hexagonal structure, the sliding alloy consists of, by weight, 0.1 to 1.5% Si, 2 to 22% Co and 1.4 to 11% Mo.

When the sintered product is heated in an oxidizing atmosphere at a temperature of 600 to 900° C., the surface of each of the Co—Mo—Cr—Si base hard particles, exposed to the surface of the sintered product, is oxidized. As a result, that portion of each of the Co—Mo—Cr—Si base hard particles 2 (dispersed in the Ni—Cr—Fe matrix 1), exposed to the surface of the sintered product, is oxidized to form a phase 2a of a Co—Mo—Cr—Si oxide, as shown in FIG. 1. Then, this phase is further oxidized, and a phase 2b of a Co—Cr oxide is formed, and then an molybdenum oxide phase 2c is formed on the surface of the Co—Cr oxide phase 2b.

When the sliding member, made of this sliding alloy, slides relative to the mating member, the molybdenum oxide phase 2c, having a lubrication property, is transferred and adhered to the mating member, thereby performing a lubrication effect. Also, the Co—Cr oxide phase 2b, which is brittle and hard, is broken into fine pieces or grains which roll between the sliding member and the mating member, and these grains achieve a kind of rolling frictional effect. It is thought that with the synergistic effect, achieved by the lubrication effect and the rolling effect, a stick-slip phenomenon is eliminated, so that a low friction coefficient is obtained.

According to another feature of the present invention, there is provided a sliding contact structure comprising a sliding member, made of the above sliding alloy, and a mating member having a sliding contact surface disposed in sliding contact with the sliding member, wherein the sliding contact surface of the mating member is subjected to a nitriding treatment. With this nitriding treatment, the friction coefficient can be reduced in the temperature range from room temperature to a high temperature, and also the wear resistance of the sliding member and the mating member is enhanced, so that there can be provided the sliding contact structure having more excellent durability.

The sliding member may have a bimetal construction, in which case, for example, the sliding alloy is bonded to a stainless steel material. Further, in order to enhance initial conformability, a coating layer, made of a solid lubricant (e.g. BN or $MoS_2$), may be coated on the sliding contact surface of the sliding member.

Preferably, the mating member is made of a heat-resistant material such as stainless steel and heat-resistant steel.

In one aspect of the invention of the high temperature sliding alloy consists of, by weight, 2 to 8% Cr, 2 to 10% Fe, 0.1 to 1.5% Si, 2 to 22% Co, 1.4 to 11% Mo, and the balance Ni, which comprises 1 to 35% by weight of Co—Mo—Cr—Si base hard particles dispersed in the matrix of the sliding alloy, and each of the hard particles has an oxide phase formed on a surface thereof. With this construction, there are achieved advantages that the friction coefficient is low in the temperature ranging from a room temperature to a high temperature and that the wear resistance of the sliding member and the mating member is enhanced.

In another aspect of the invention, the sliding contact structure comprises the sliding member, made of the above sliding alloy, and the mating member having the sliding contact surface disposed in sliding contact with the sliding member, wherein the sliding contact surface of the mating member is subjected to the nitriding treatment. With this construction, there is achieved an advantage that the wear resistance of the sliding member and the mating member is enhanced.

DESCRIPTION OF THE INVENTION

This invention will now be described by way of examples.

In order to prepare test samples of Examples 1 and 2 and Comparative Examples 1 and 2, the following powder materials (starting materials) were mixed together. Pure Ni powder had a particle diameter of not more than 250 mesh (not more than 60$\mu$m). Fe—Cr alloy powder had a particle diameter of not more than 250 mesh (not more than 60 $\mu$m), and consisted of, by weight, 46% Cr and the balance Fe and unavoidable impurities. Co—Mo—Cr—Si alloy powder had a particle diameter of not more than 100 mesh (not more than 150 $\mu$m), and consisted of, by weight, 28% Mo, 8.5% Cr, 2.5% Si and the balance Co and unavoidable impurities.

These starting powder materials were mixed together in a predetermined blend ratio, and more specifically 73.5 wt. % pure Ni powder, 16.5 wt. % Fe—Cr alloy powder and 10 wt. % Co—Mo—Cr—Si alloy powder were mixed together. As a result, there was prepared the powder mixture consisting of, by weight, 8.2% Cr, 5.2% Fe, 0.5% Si, 6.7% Co, 3.5% Mo and the balance Ni. In order to enhance the formability, 1% of zinc stearate was added to these powder materials when mixing them together. The powder mixture, thus obtained, was formed or compacted at a compacting pressure of 6 t/cm$^2$ into a cylindrical shape having a diameter of 32 mm and a length of 30 mm.

The thus obtained compact was heated at 500° C., and the zinc stearate was sufficiently removed by dewaxing, and then the compact was sintered at 1,150° C. for one hour in an atmosphere of $H_2+N_2$, thereby providing a round rod. Ring-shaped test pieces were formed from the thus obtained round rod, and were used as the test samples of Comparative Examples 1 and 2.

Figure 1:
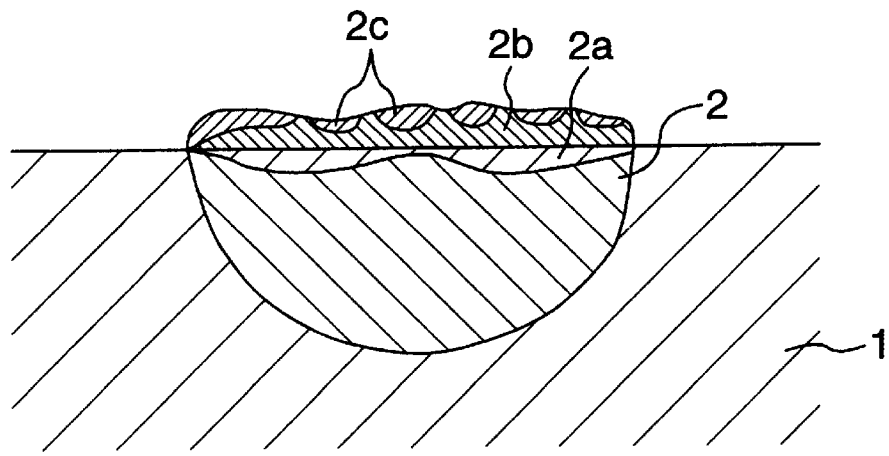
FIG. 1 is a cross-sectional view schematically showing a condition in which Co—Mo—Cr—Si base hard particles are oxidized.

With respect to Examples 1 and 2, ring-shaped test pieces, formed from the round rod, were further subjected to an oxidizing treatment, and more specifically these test pieces were heated at 800° C. for 30 minutes in air atmosphere. As a result of this oxidizing treatment, that portion of each of Co—Mo—Cr—Si base hard particles 2 (dispersed in the Ni—Cr—Fe matrix 1), exposed to the surface of the sintered product, was oxidized, so that a Co—Mo—Cr—Si oxide phase 2a, a Co—Cr oxide phase 2b and a molybdenum oxide phase 2c (formed on the surface of the Co—Cr oxide phase 2b) were formed, as schematically shown in FIG. 1.

With respect to Comparative Examples 3 and 4, ring-shaped test pieces were formed from heat-resistant steel (JIS SUH3), and were used as the test samples.

The thus obtained test samples of Examples 1 and 2 and Comparative Examples 1 to 4 were subjected to a wear test at 20° C. (room temperature), 540° C. and 800° C. With respect to Example 2 and Comparative Examples 2 and 4, a material of JIS SUS303 (having a hardness of Hv200 and consisting of 9% Ni, 18% Cr and the balance Fe and unavoidable impurities), formed into a ring-shaped, was used as a mating member, and with respect to Example 1 and Comparative Examples 1 and 3, a material of JIS SUS303, subjected to a nitriding treatment to have a hardness of Hv1100, was used as a mating member.

The test was conducted at a speed of 1.2 m/min. for 30 minutes, with a load of 25 Kgf/cm$^2$ being applied to the ring.

Figure 2:
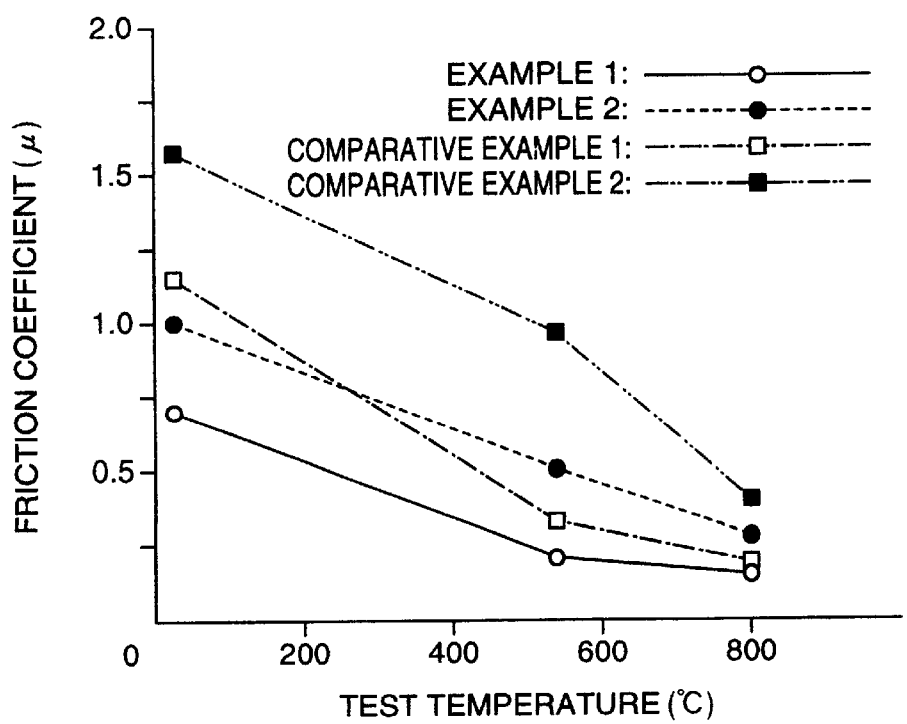
FIG. 2 is a graph showing the relation between a test temperature and a friction coefficient.
Figure 3:
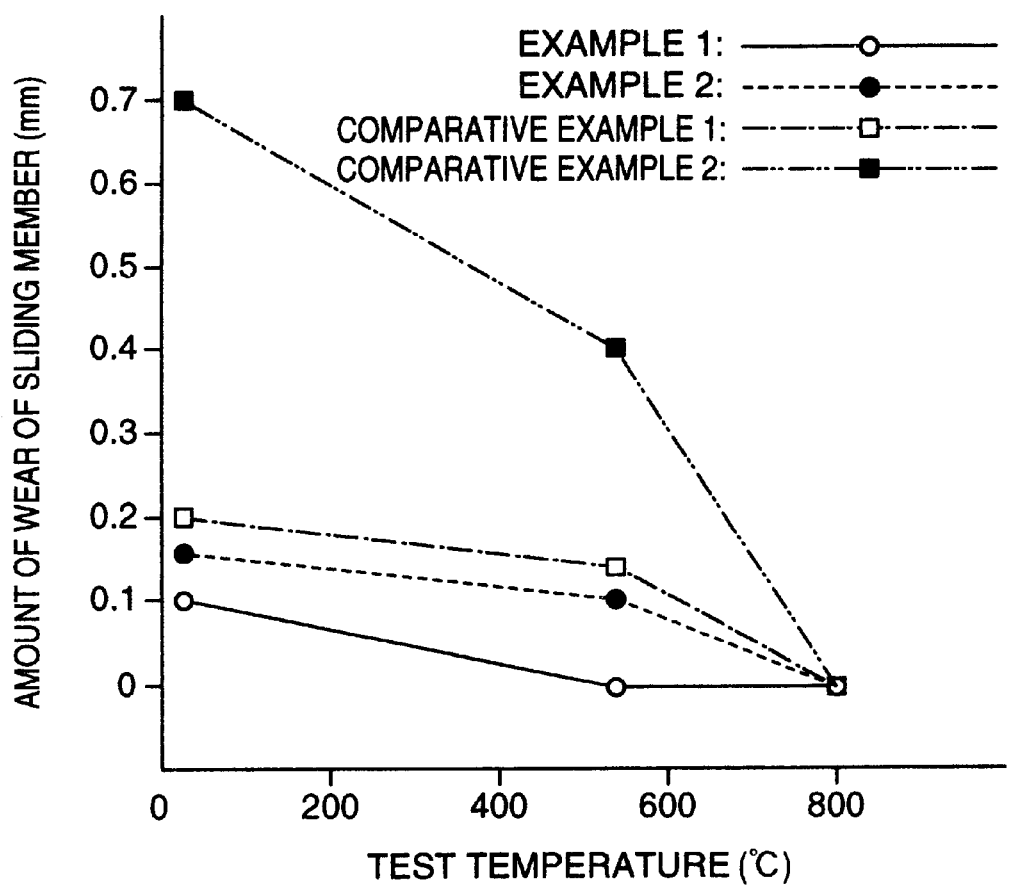
FIG. 3 is a graph showing the relation between the test temperature and the amount of wear of sliding members.

With respect to the friction coefficient, the amount of wear of the sliding members and the amount of wear of the mating members, test results were obtained, shown in Tables 1 to 3. FIG. 2 is a graph showing the friction coefficient of Examples 1 and 2 and Comparative Examples 1 and 2, and FIG. 3 is a graph showing the amount of wear of the sliding members of these Examples and Comparative Examples. Comparative Examples 3 and 4 seizured soon after the start of the test conducted at the room temperature (20° C.), and therefore the test was stopped.

TABLE 1

| | | COMPARATIVE ITEMS | | | |
|---|---|---|---|---|---|
| | | Mating member Nitriding treatment | Friction coefficient | | |
| CASE | | is applied? Yes (○), No (×) | Room temperature | 540° C. | 800° C. |
| Example | 1 | ○ | 0.70 | 0.24 | 0.20 |
| | 2 | × | 1.00 | 0.49 | 0.31 |
| Comparative Example | 1 | ○ | 1.22 | 0.32 | 0.22 |
| | 2 | × | 1.60 | 0.90 | 0.42 |

TABLE 1-continued

| | COMPARATIVE ITEMS | | | | |
|---|---|---|---|---|---|
| | Mating member Nitriding treatment | Friction coefficient | | | |
| CASE | is applied? Yes (○), No (x) | Room temperature | 540° C. | 800° C. |
| 3 | ○ | * | 1.20 | 0.75 |
| 4 | x | * | 1.50 | 1.80 |

*Measurement was not available because of the occurrence of seizure.

In all of the test samples except that of Comparative Example 4, the friction coefficient decreased with the increase of the temperature. The friction coefficient of Comparative Example 2 at the room temperature (20° C.) was 1.6 while the friction coefficient of Example 2 was 1.00, which is much lower than that of Comparative Example 2, and therefore the effect of exhibiting the low friction coefficient at the room temperature has been confirmed. When the nitriding treatment was applied to the mating member to increase the hardness thereof, the friction coefficient was further decreased, and the friction coefficient of Comparative Example 1 was 1.22, and the friction coefficient of Example 1 was 0.70.

TABLE 2

| | | COMPARATIVE ITEMS | | | |
|---|---|---|---|---|---|
| | | Mating member Nitriding treatment | Amount of wear of sliding member (mm) | | |
| CASE | | is applied? Yes (○), No (x) | Room temperature | 540° C. | 800° C. |
| Example | 1 | ○ | 0.1 | 0.0 | 0.0 |
| | 2 | x | 0.17 | 0.1 | 0.0 |
| Comparative | 1 | ○ | 0.2 | 0.14 | 0.0 |
| Example | 2 | x | 0.7 | 0.4 | 0.0 |
| | 3 | ○ | * | 0.0 | 1.0 |
| | 4 | x | * | 0.8 | 0.9 |

*Measurement was not available because of the occurrence of seizure.

In Examples 1 and 2 and Comparative Examples 1 and 2, the amount of wear of the sliding member decreased with the increase of the temperature, and the wear amount at 800° C. was as small as 0 mm which can be ignored. The wear amount of the sliding member of Comparative Example 2 at the room temperature was 0.7 mm while the wear amount of Example 2 was 0.17 mm, which is much smaller than that of Comparative Example 2, and therefore it has been confirmed that the wear resistance of Example 2 at the room temperature is excellent. In Example 1 and Comparative Example 1 in which the nitriding treatment was applied to the mating member, the wear amount was smaller.

TABLE 3

| | | COMPARATIVE ITEMS | | | |
|---|---|---|---|---|---|
| | | Mating member Nitriding treatment | Amount of wear of mating member (mm) | | |
| CASE | | is applied? Yes (○), No (x) | Room temperature | 540° C. | 800° C. |
| Example | 1 | ○ | 0.0 | 0.0 | 0.0 |
| | 2 | x | 0.0 | 0.0 | 0.0 |

TABLE 3-continued

| | | COMPARATIVE ITEMS | | | |
|---|---|---|---|---|---|
| | | Mating member Nitriding treatment | Amount of wear of mating member (mm) | | |
| CASE | | is applied? Yes (○), No (x) | Room temperature | 540° C. | 800° C. |
| Comparative | 1 | ○ | 0.0 | 0.0 | 0.0 |
| Example | 2 | x | 2.0 | 0.14 | 0.0 |
| | 3 | ○ | * | 0.0 | 0.0 |
| | 4 | x | * | 2.0 | 2.7 |

*Measurement was not available because of the occurrence of seizure.

In Examples 1 and 2, the amount of wear of the mating member was as small as 0 mm which can be ignored. On the other hand, in Comparative Example 2, the wear amount at the room temperature was 2.0 mm, and the wear amount at 540° was 0.14 mm, and therefore it has been confirmed that Example 2 is excellent in non-attack property.

What is claimed is:

1. A high temperature sliding alloy consisting of, by weight, 2 to 8.2% Cr, 2 to 10% Fe, 0.1 to 1.5% Si, 2 to 22% Co, 1.4 to 11% Mo, and the balance Ni, which comprises 1 to 35% by weight of Co—Mo—Cr—Si base hard particles of close-packed hexagonal structure dispersed in a matrix of said sliding alloy, and each of said hard particles has an phase formed on a surface, thereof, and wherein said oxide comprises a first phase of Co—Mo—Cr—Si oxide, a second phase thereover of a Co—Cr oxide, and an uppermost third phase of Mo oxide.

2. A sliding contact structure comprising a sliding member made of a high temperature sliding alloy consisting of, by weight, 2 to 8.2% Cr, 2 to 10% Fe, 0.1 to 1.5% Si, 2 to 22% Co, 1.4 to 11% Mo, and the balance Ni, which comprises 1 to 35% by weight of Co—Mo—Cr—Si base hard particles dispersed in a matrix of said sliding alloy, and each of said hard particles has an oxide formed on a surface thereof, and wherein said oxide comprises a first phase of Co—Mo—Cr—Si oxide, a second phase thereover of a Co—Cr oxide, and an uppermost third phase of Mo oxide, and a mating member having a sliding contact surface disposed in sliding contact with said sliding member, wherein said sliding contact surface comprises a nitrided surface layer.

3. An article of manufacture for subsequent installation as a bearing part for use in a high temperature environment, comprising a metal substrate, and a sliding alloy on said metal substrate, said sliding alloy consisting of, by weight, 2 to 8.2% Cr, 2 to 10% Fe, 0.1 to 1.5% Si, 2 to 22% Co, 1.4 to 11% Mo, and the balance Ni, which comprises 1 to 35% by weight of Co—Mo—Cr—Si base hard particles of close-packed hexagonal structure dispersed in a matrix of said sliding alloy, and each of said hard particles has an oxide formed on a surface thereof, and wherein said oxide comprises a first phase of Co—Co—Mo—Cr—Si oxide, a second phase thereover of a Co—Cr oxide, and an uppermost third phase of Mo oxide.

* * * * *